United States Patent
Lai

(10) Patent No.: US 9,030,289 B2
(45) Date of Patent: May 12, 2015

(54) TOUCH SENSING APPARATUS

(75) Inventor: Yu-Cheng Lai, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 684 days.

(21) Appl. No.: 13/330,720

(22) Filed: Dec. 20, 2011

(65) Prior Publication Data
US 2013/0020186 A1  Jan. 24, 2013

(30) Foreign Application Priority Data
Jul. 21, 2011 (TW) .............................. 100125796 A

(51) Int. Cl.
H01C 10/10 (2006.01)
G06F 3/045 (2006.01)
G06F 3/041 (2006.01)

(52) U.S. Cl.
CPC .............. *G06F 3/045* (2013.01); *G06F 3/0414* (2013.01)

(58) Field of Classification Search
CPC ..... G06F 3/045; G06F 3/0414; G06F 3/0412; G06F 2200/1612; G06F 3/03547; G06F 3/041; H01H 11/00; H01H 1/10; H01H 2009/0221
USPC ................................................. 200/5 A, 600
See application file for complete search history.

(56) References Cited

U.S. PATENT DOCUMENTS

| | | | |
|---|---|---|---|
| 4,547,668 A | 10/1985 | Tsikos | |
| 4,801,771 A * | 1/1989 | Mizuguchi et al. | ......... 200/86 R |
| 5,010,213 A * | 4/1991 | Moriwaki et al. | ......... 178/18.05 |
| 5,668,353 A * | 9/1997 | Matsuda et al. | ........... 178/18.05 |
| 6,154,580 A | 11/2000 | Kuriyama et al. | |
| 6,627,918 B2 * | 9/2003 | Getz et al. | ........................ 257/59 |
| 6,675,637 B2 | 1/2004 | Saito | |
| 6,886,415 B1 | 5/2005 | Kurogi et al. | |
| 7,278,326 B2 | 10/2007 | Kobayashi et al. | |
| 7,312,791 B2 | 12/2007 | Hoshino et al. | |
| 7,353,719 B2 | 4/2008 | Hiura et al. | |
| 7,369,122 B2 * | 5/2008 | Cross et al. | ................... 345/173 |
| 8,134,537 B2 * | 3/2012 | Chen et al. | ................... 345/173 |
| 8,378,983 B2 * | 2/2013 | Nozawa et al. | ................ 345/173 |

(Continued)

FOREIGN PATENT DOCUMENTS

| | | |
|---|---|---|
| CN | 201556183 | 8/2010 |
| TW | M246720 | 10/2004 |

(Continued)

OTHER PUBLICATIONS

Ju et al., "Fabrication of fully transparent nanowire transistors for transparent and flexible electronics", Nature nanotechnology, Jun. 3, 2007, pp. 378-384.

(Continued)

*Primary Examiner* — Kyung Lee
(74) *Attorney, Agent, or Firm* — Jianq Chyun IP Office

(57) ABSTRACT

A touch sensing apparatus has a plurality of unit regions, and each of the unit regions includes a first substrate, a second substrate and a spacer structure. The first substrate has a first electrode layer thereon. The second substrate is disposed opposite to the first substrate and has a second electrode thereon. The spacer structure is disposed between the first substrate and the second substrate. In particular, there are plural of sensing units in each of the unit regions, and sensing trigger forces of the sensing units in the unit region are not completely the same.

14 Claims, 7 Drawing Sheets

(56) References Cited

U.S. PATENT DOCUMENTS

| | | | |
|---|---|---|---|
| 2003/0141118 A1* | 7/2003 | Kakuno | 178/18.01 |
| 2005/0110772 A1* | 5/2005 | Kong et al. | 345/174 |
| 2011/0026202 A1 | 2/2011 | Kai et al. | |
| 2011/0134053 A1* | 6/2011 | Kao et al. | 345/173 |
| 2011/0193794 A1* | 8/2011 | Hu et al. | 345/173 |

FOREIGN PATENT DOCUMENTS

| | | |
|---|---|---|
| TW | 201003469 | 1/2010 |
| TW | 201007149 | 2/2010 |

OTHER PUBLICATIONS

Moeller et al., "Scanning FTIR: Unobtrusive Optoelectronic Multi-Touch Sensing through Waveguide Transmissivity Imaging", Proceedings of the fourth international conference on Tagible, embedded and embodied interaction, Jan. 24, 2010, pp. 73-76.

Smith et al., "Low-Cost Malleable Surfaces with Multi-Touch Pressure Sensitivity", Second Annual IEEE International Workshop on Horizontal Interactive Human-Computer System, Oct. 10, 2007, pp. 205-208.

"Office Action of Taiwan Counterpart Application", issued on Jun. 23, 2014, p. 1-p. 3.

"Office Action of China Counterpart Application", issued on Nov. 14, 2014, p. 1-p. 6.

* cited by examiner

TOUCH SENSING APPARATUS

CROSS-REFERENCE TO RELATED APPLICATION

This application claims the priority benefit of Taiwan application serial no. 100125796, filed on Jul. 21, 2011. The entirety of the above-mentioned patent application is hereby incorporated by reference herein and made a part of this specification.

BACKGROUND OF THE DISCLOSURE

1. Field of the Disclosure

The disclosure relates to a touch sensing apparatus. Particularly, the disclosure relates to a touch sensing apparatus capable of estimating a touch force.

2. Description of Related Art

As flat panel displays are widely used, touch panels used for replacing input devices such as keyboards and mouses become popular, so as to facilitate utilization of various information products. For example, a car touch panel can be used for car navigation. Moreover, touch panels are widely used in human-controlled machines such as game machines, public information systems (including vending machines, bank automatic teller machines (ATMs) and guide systems), personal digital assistants (PDAs), e-books, etc.

Presently, regarding a manufacturing method of the touch panel, a transparent thin film and a glass substrate are first cut into desired sizes. Then, electrodes, wires, spacers and isolation layers are formed on each transparent thin film and each glass substrate. Thereafter, the transparent thin films and the glass substrates are adhered to form the touch panels. However, the transparent electrode material of the touch panel does not have a piezoresistive characteristic, so that when the user touches the touch panel, the touch panel can only sense a touch position on an XY plane, and cannot sense a touch force along a Z-direction.

SUMMARY OF THE DISCLOSURE

The disclosure provides a touch sensing apparatus having a plurality of unit regions, and each of the unit regions includes a first substrate, a second substrate and a spacer structure. The first substrate has a first electrode layer thereon. The second substrate is disposed opposite to the first substrate and has a second electrode layer thereon. The spacer structure is disposed between the first substrate and the second substrate. In particular, each of the unit regions has a plurality of sensing units, and sensing trigger forces of the sensing units in the unit region are not completely the same.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

First Exemplary Embodiment

Figure 1:
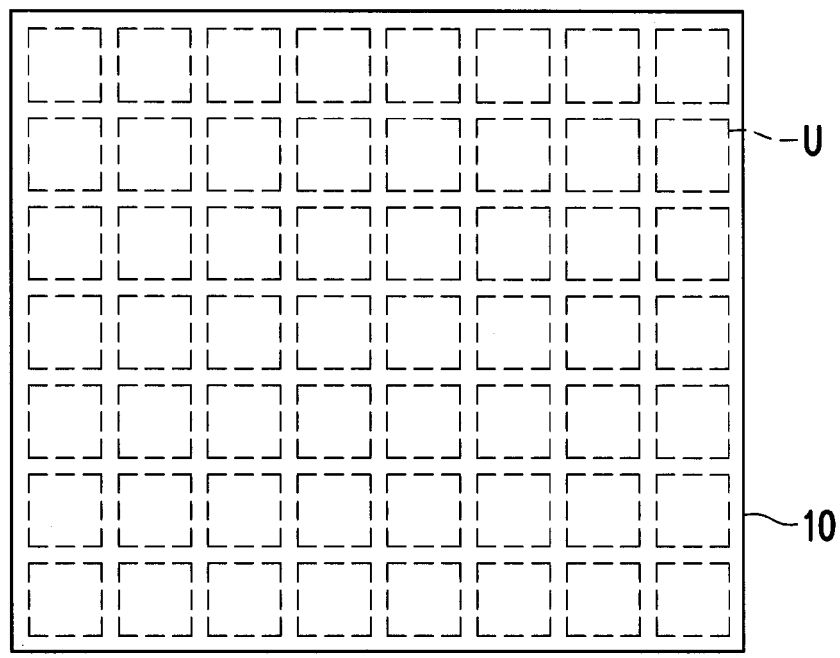
FIG. 1 is a top view of a touch sensing apparatus according to the first exemplary embodiment of the disclosure.
Figure 2:
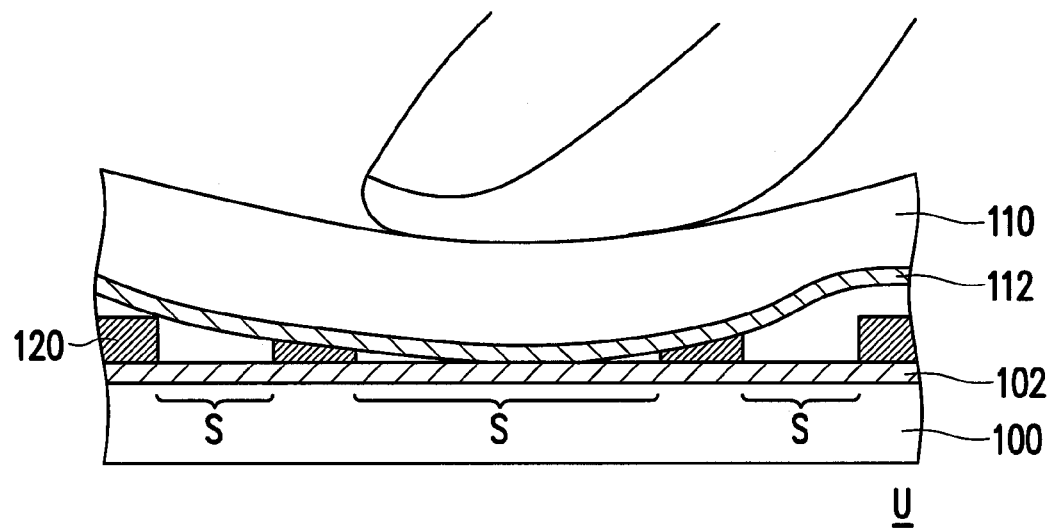
FIG. 2 is a cross-sectional view of a unit region of the touch sensing apparatus of FIG. 1.
Figure 3:
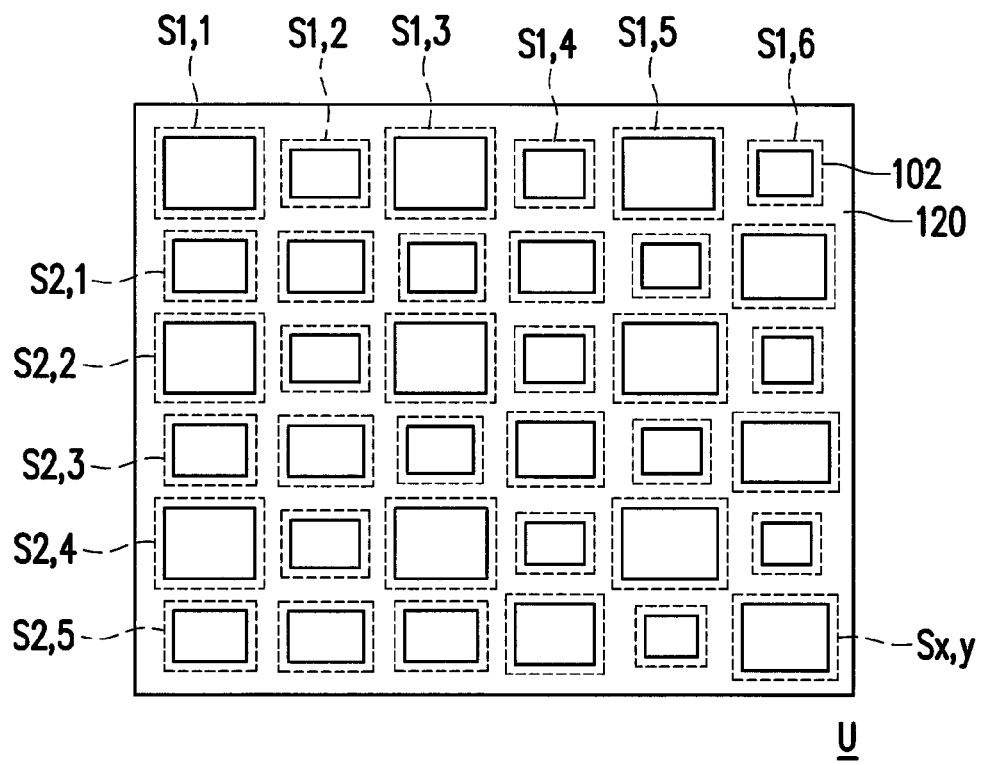
FIG. 3 is a top view of the unit region of the touch sensing apparatus of FIG. 1.

FIG. 1 is a top view of a touch sensing apparatus according to the first exemplary embodiment of the disclosure. FIG. 2 is a cross-sectional view of a unit region of the touch sensing apparatus of FIG. 1. FIG. 3 is a top view of the unit region of the touch sensing apparatus of FIG. 1. Referring to FIG. 1, FIG. 2 and FIG. 3, the touch sensing apparatus 10 has a plurality of unit regions U. Generally, a size of each unit region U is approximately equivalent to a size of a finger, which is about 9 mm×9 mm, though the disclosure is not limited thereto. In other words, in other embodiments, the size of the unit region U can also be larger or smaller according to an actual design requirement.

Moreover, the touch sensing apparatus 10 of the present exemplary embodiment is a resistive touch sensing apparatus, which includes a first substrate 100, a second substrate 110 and a spacer structure 120.

The first substrate 100 has a first electrode layer 102 thereon. The first substrate 100 can be a rigid substrate or a flexible substrate, and a material thereof can be glass, quartz, organic polymer, opaque material or other suitable materials. In the present exemplary embodiment, the first substrate 100 is a rigid substrate, though the disclosure is not limited thereto. The first electrode layer 102 is disposed on a surface of the first substrate 100. A material of the first electrode layer 102 is a transparent conductive material or a non-transparent conductive material. The transparent conductive material includes metal oxide, for example, indium tin oxide, indium zinc oxide, aluminium tin oxide, aluminium zinc oxide, indium germanium zinc oxide, or other suitable metal oxides. The non-transparent conductive material includes metal such as aluminium, copper, silver or other metal or alloys thereof.

The second substrate 110 is disposed opposite to the first substrate 100, and the second substrate 110 has a second electrode layer 112 thereon. The second substrate 110 can be a rigid substrate or a flexible substrate, and a material thereof can be glass, quartz, organic polymer, opaque material or other suitable materials. In the present exemplary embodiment, the second substrate 110 is a flexible substrate, though the disclosure is not limited thereto. The second electrode layer 112 is disposed on a surface of the second substrate 110. A material of the second electrode layer 112 is a transparent conductive material or a non-transparent conductive material. The transparent conductive material includes metal oxide, for example, indium tin oxide, indium zinc oxide, aluminium tin oxide, aluminium zinc oxide, indium germanium zinc oxide, or other suitable metal oxides. The non-transparent conductive material includes metal such as aluminium, copper, silver or other metal or alloys thereof.

It should be noticed that in the present exemplary embodiment, the first substrate 100 and the second substrate 110 of simple blank substrates are taken as an example for descriptions, though the disclosure is not limited thereto, and in other embodiments, besides the first electrode layer 102 and the second electrode layer 112, other devices and/or film layers can be disposed on the first substrate 100 and the second substrate 110. For example, the first substrate 100 and the second substrate 110 may further include external wires and control devices, etc. Moreover, when the touch sensing apparatus is integrated with a display panel to construct a touch display panel, the first substrate 100 and the second substrate 110 are further configured with corresponding display devices including display pixel structures, etc.

Moreover, the spacer structure 120 is disposed between the first substrate 100 and the second substrate 110. Particularly, each of the unit regions U has a plurality of sensing units S, and sensing trigger forces of the sensing units S in each of the unit regions U are not completely the same. In the present exemplary embodiment, the spacer structure 120 defines a plurality of the sensing units S in each of the unit regions U. As shown in FIG. 3, the sensing units S of the unit region U are marked as S1,1~Sx,y according to positions thereof. The sensing trigger forces refer to respective minimal trigger forces of the sensing units S1,1~Sx,y. In the sensing units S1,1~Sx,y of the unit region U of the present exemplary embodiment, the sensing trigger forces of a part of the sensing units S1,1~Sx,y are the same, though the sensing trigger forces of the sensing units S1,1~Sx,y are not completely the same.

For clarity's sake, in the present exemplary embodiment, the unit region U having 6×6 sensing units S1,1~Sx,y is taken as an example for descriptions. However, the number of the sensing units S1,1~Sx,y in each of the unit regions U is not limited by the disclosure, and the more the number of the sensing units S1,1~Sx,y in each of the unit regions U is, the higher sensitivity the unit region U has. Comparatively, the less the number of the sensing units S1,1~Sx,y in each of the unit regions U is, the lower sensitivity the unit region U has. The number of the sensing units S1,1~Sx,y (i.e. the sensitivity of the unit region U) is mainly determined according to an application of the touch sensing panel.

In the present exemplary embodiment, as shown in FIG. 2 and FIG. 3, the spacer structure 120 is disposed on the first electrode layer 102. Particularly, areas of the first electrode layer 102 exposed by the spacer structure 120 in the sensing units S1,1~Sx,y are not completely the same. In detail, as shown in FIG. 3, the spacer structure 120 of the unit region U is a mesh spacer structure, and the first electrode layer 102 exposed by each mesh opening of the mesh spacer structure 120 corresponds to each of the sensing units S1,1~Sx,y. Particularly, areas of the first electrode layer 102 (corresponds to each of the sensing units S1,1~Sx,y) exposed by the mesh openings of the mesh spacer structure 120 are not completely the same, so that the sensing trigger forces of the sensing units S1,1~Sx,y are not completely the same. In FIG. 3, the greater the mesh opening of the mesh spacer structure 120 is (the greater the exposed first electrode layer 102 is), the smaller the sensing trigger force of the corresponding one of the sensing unit S1,1~Sx,y is.

It should be noticed that the number of the sensing trigger forces of the sensing unit S1,1~Sx,y is not limited by the disclosure, and distribution of the sensing trigger forces of the sensing unit S1,1~Sx,y in the unit region U is also not limited by the disclosure.

According to the above descriptions, when a user touches the touch sensing apparatus 10, the second electrode layer 112 of the touched unit region U contacts the corresponding first electrode layer 102 due to a pressing force. Now, the unit region U generates a corresponding touch signal. Then, a position (a position on an XY plane) of the touch sensing apparatus 10 touched by the user can be estimated according to the touch signal. Moreover, since the sensing units S1,1~Sx,y of the unit region U has different sensing trigger forces, when the user touches the touch sensing apparatus 10, specific sensing units in the sensing units S1,1~Sx,y of the touched unit region U are triggered. A touch force of the touch operation can be estimated through analysis and calculation. In other words, besides including a touch position signal of the XY plane, the touch signal also includes a touch force signal of the Z-direction.

In the exemplary embodiment of FIG. 3, the spacer structure 120 of the unit region U is a mesh spacer structure, so that the sensing trigger forces of the sensing units S1,1~Sx,y are different. However, the disclosure is not limited thereto, and in other embodiments, the spacer structure 120 may have other patterns, for example, the spacer structure 120 includes a plurality of dot spacers, which is described in detail below.

Figure 4:
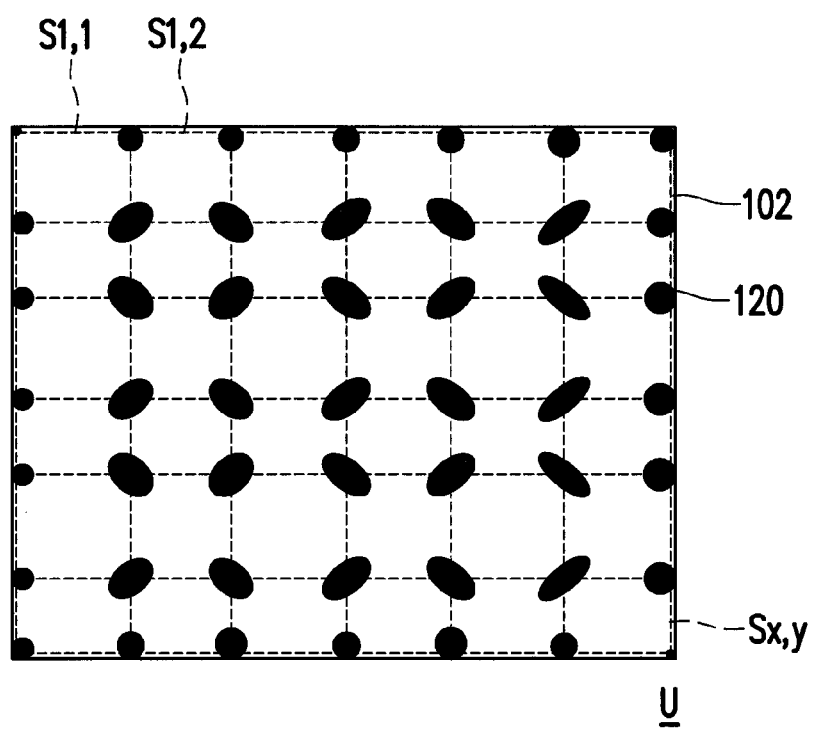
FIG. 4 is a top view of a unit region of a touch sensing apparatus according to another exemplary embodiment of the disclosure.

FIG. 4 is a top view of a unit region of a touch sensing apparatus according to another exemplary embodiment of the disclosure. The exemplary embodiment of FIG. 4 is similar to the embodiment of FIG. 2 and FIG. 3, so that the same devices are denoted by the same symbols, and descriptions thereof are not repeated. Referring to FIG. 4, the spacer structure 120 of the touch sensing apparatus of the present exemplary embodiment includes a plurality of dot spacers distributed in the unit region U. Particularly, in the present exemplary embodiment, shapes of the dot spacers 120 in the unit region U are not completely the same, so that the sensing trigger forces of the sensing units S1,1~Sx,y are not completely the same. For example, shapes of the dot spacers 120 in the unit region U include rounds, ovals, elongated ovals, etc.

Moreover, since shapes of the dot spacers 120 in the unit region U are not completely the same, spaces between the dot spacers 120 are not completely the same. Since the shapes and the spaces of the dot spacers 120 in the unit region U are not completely the same, areas of the first electrode layer 102 exposed by the sensing units S1,1~Sx,y are not completely the same. Since the areas of the first electrode layer 102 exposed by the sensing units S1,1~Sx,y are not completely the same, the sensing trigger forces of the sensing units S1,1~Sx,y are not completely the same.

According to another embodiment, the shapes of the dot spacers 120 in the unit region U can be identical, though the spaces between the dot spacers 120 are not completely the same, in this way, the sensing trigger forces of the sensing units S1,1~Sx,y are also not completely the same.

Similarly, the number of the sensing unit S1,1~Sx,y in each of the unit regions U, the number of the sensing trigger forces of the sensing unit S1,1~Sx,y, and distribution of the sensing trigger forces of the sensing unit S1,1~Sx,y in the unit region U are not limited by the disclosure. Moreover, the shapes of the dot spacers 120 in the unit region U are not limited by the disclosure. In other words, besides rounds and ovals, the shapes of the dot spacers 120 can also be triangles, quadrilaterals, polygons, irregular shapes or combinations thereof.

Figure 5:
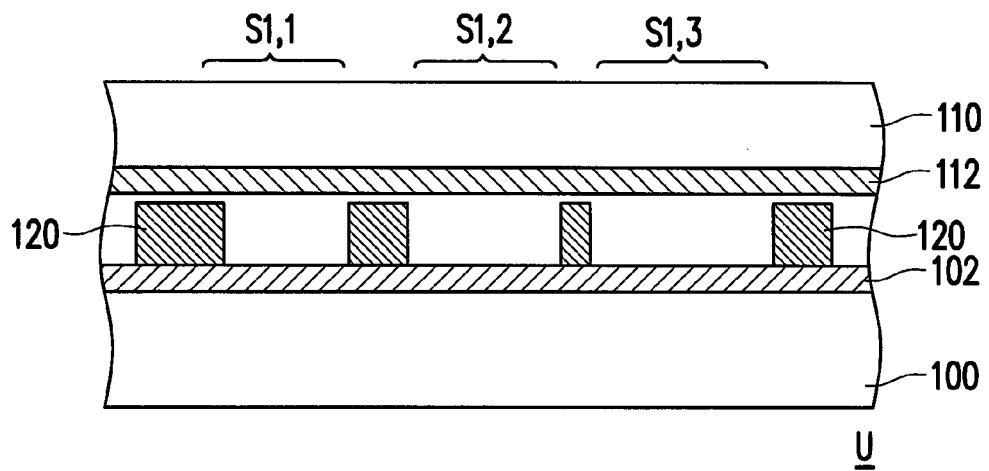
FIGS. 5-7 are cross-sectional views of a unit region of a touch sensing apparatus according to multiple exemplary embodiments of the disclosure.

FIG. 5 is a cross-sectional view of a unit region of a touch sensing apparatus according to an exemplary embodiment of the disclosure. The exemplary embodiment of FIG. 5 is similar to the embodiment of FIG. 2 and FIG. 3, so that the same devices are denoted by the same symbols, and descriptions thereof are not repeated. Referring to FIG. 5, the spacer structure 120 of the touch sensing apparatus of the present exemplary embodiment is multiple dot spacers distributed in the unit region U. Particularly, in the present exemplary embodiment, sizes of the dot spacers 120 in the unit region U are not completely the same. For example, the size of the spacer structure 120 located at a left side of the sensing unit S1,1 is relatively large, and the size of the spacer structure 120 located between the sensing unit S1,1 and the sensing unit S1,2 is relatively small. Therefore, the sensing trigger force of the sensing unit S1,1 is greater than the sensing trigger force of the sensing unit S1,2.

It should be noticed that since the sizes of the dot spacers 120 in the unit region U are not completely the same, spaces between the dot spacers 120 are not completely the same. Similarly, since the sizes of the spacer structures 120 are not completely the same, areas of the first electrode layer 102 exposed by the sensing units S1,1~Sx,y are not completely the same, so that the sensing trigger forces of the sensing units S1,1~Sx,y are not completely the same.

Figure 6:

FIG. 6 is a cross-sectional view of a unit region of a touch sensing apparatus according to an exemplary embodiment of the disclosure. The exemplary embodiment of FIG. 6 is similar to the embodiment of FIG. 2 and FIG. 3, so that the same devices are denoted by the same symbols, and descriptions thereof are not repeated. Referring to FIG. 6, the spacer structure 120 of the touch sensing apparatus of the present exemplary embodiment includes a plurality of dot spacers distributed in the unit region U. Particularly, in the present exemplary embodiment, heights of the dot spacers 120 in the unit region U are not completely the same. For example, the height of the spacer structure 120 located at the left side of the sensing unit S1,1 is relatively high, and the height of the spacer structure 120 located between the sensing unit S1,1 and the sensing unit S1,2 is relatively low. Since the heights of the spacer structures 120 are not completely the same, the sensing trigger forces of the sensing units S1,1~Sx,y are not completely the same.

Figure 7:
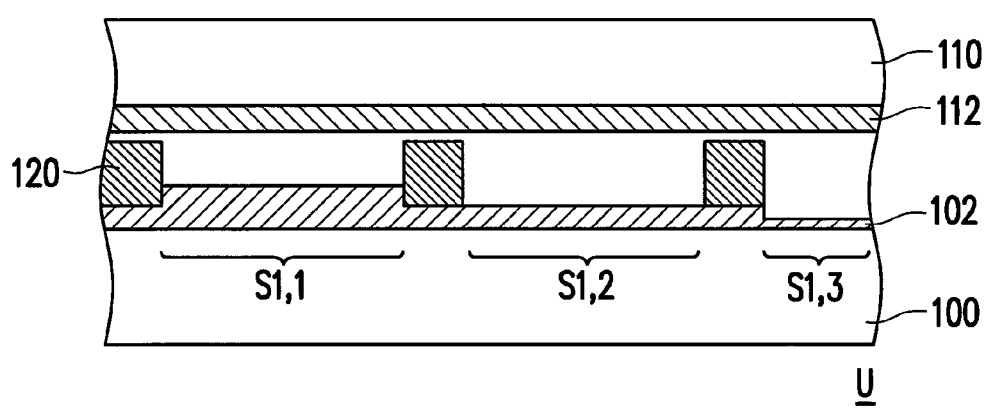

FIG. 7 is a cross-sectional view of a unit region of a touch sensing apparatus according to an exemplary embodiment of the disclosure. The exemplary embodiment of FIG. 7 is similar to the embodiment of FIG. 2 and FIG. 3, so that the same devices are denoted by the same symbols, and descriptions thereof are not repeated. Referring to FIG. 7, thicknesses of the first electrode layers 102 in the sensing units S1,1~Sx,y of the unit region U are not completely the same. For example, the thickness of the first electrode layer 102 in the sensing unit S1,1 is relatively thick, the thickness of the first electrode layer 102 in the sensing unit S1,2 is slightly thin, and the thickness of the first electrode layer 102 in the sensing unit S1,3 is relatively thin. Here, a sensing trigger force of the sensing units S1,1 is smaller than a sensing trigger force of the sensing unit S1,2, and the sensing trigger force of the sensing unit S1,2 is smaller than a sensing trigger force of the sensing unit S1,3. In other words, based on the design that the thicknesses of the first electrode layers 102 in the sensing units S1,1~Sx,y are not completely the same, an effect that the sensing trigger forces of the sensing units S1,1~Sx,y are not completely the same is also achieved.

In the exemplary embodiment of FIG. 7, the thicknesses of the first electrode layers 102 in the sensing unit S1,1~Sx,y are designed to be not completely the same, though in other embodiments, thicknesses of the second electrode layers 112 in the sensing unit S1,1~Sx,y are designed to be not completely the same to achieve the effect that the sensing trigger forces of the sensing units S1,1~Sx,y are not completely the same. Alternatively, thicknesses of the first electrode layers 102 and the second electrode layers 112 in the sensing unit S1,1~Sx,y are designed to be not completely the same to achieve the effect that the sensing trigger forces of the sensing units S1,1~Sx,y are not completely the same.

The touch sensing apparatus of the embodiments of FIG. 1 to FIG. 7 is a resistive touch sensing apparatus, though the disclosure is not limited thereto. The technique of designing the sensing units with different sensing trigger forces in each of the unit regions can also be applied to other types of the touch sensing apparatus, which is described as follows.

Second Exemplary Embodiment

Figure 8:
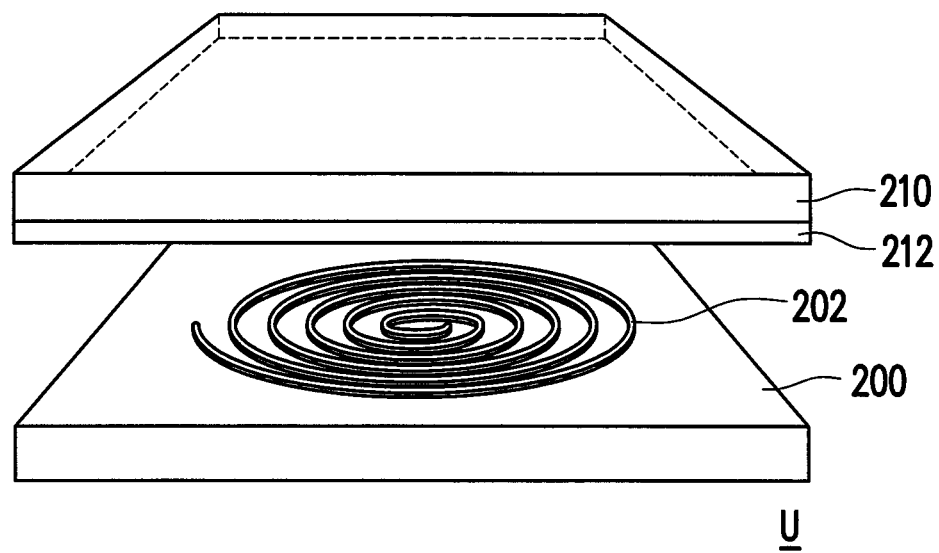
FIG. 8 is a schematic diagram of a unit region of a touch sensing apparatus according to another exemplary embodiment of the disclosure.
Figure 9:
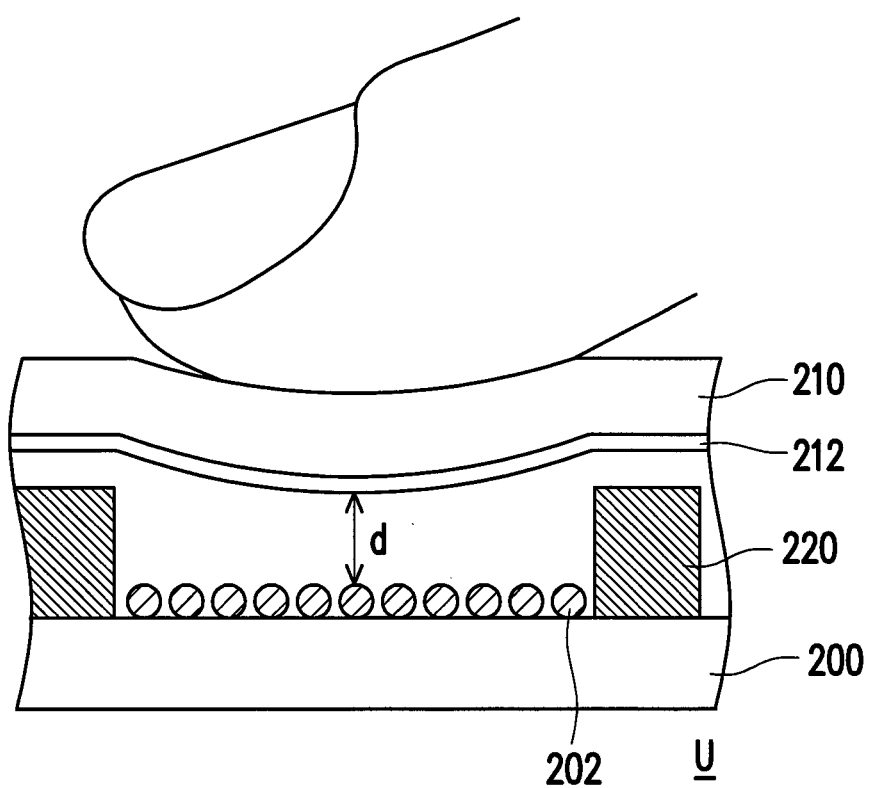
FIG. 9 is a cross-sectional view of the unit region of the touch sensing apparatus of FIG. 8.

FIG. 8 is a schematic diagram of a unit region of a touch sensing apparatus according to a second exemplary embodiment of the disclosure. FIG. 9 is a cross-sectional view of the unit region of the touch sensing apparatus of FIG. 8. Referring to FIG. 8 and FIG. 9, the touch sensing apparatus of the present exemplary embodiment is an inductive touch sensing apparatus having a plurality of the unit regions U, where each of the unit regions U has a plurality of sensing units S1,1~Sx,y (shown in FIG. 3). Similarly, the sensing trigger forces of the sensing units S1,1~Sx,y of each unit region U are not completely the same.

In detail, the touch sensing apparatus of the present exemplary embodiment includes a first substrate 200, a second substrate 210 and a spacer structure 220. The first substrate 200 has a first electrode layer 202 thereon. The second substrate 210 has a second electrode layer 212 thereon. Materials of the first substrate 200, the second substrate 210, the first electrode layer 202 and the second electrode layer 212 of the present exemplary embodiment are the same or similar to the materials of the substrates and the electrodes of the embodiments of FIG. 1~FIG. 7, so that descriptions thereof are not repeated. However, since the touch sensing apparatus of the present exemplary embodiment is the inductive touch sensing apparatus, the first electrode layer 202 on the first substrate 200 has a plurality of coil patterns. The first electrode layer 202 in each of the unit regions U is a coil pattern. Similarly, the space structure 220 is disposed between the first substrate 200 and the second substrate 210.

A plurality of manners can be used to achieve the effect that the sensing trigger forces of the sensing units S1,1~Sx,y in the unit region U are not completely the same. In the present embodiment, numbers of turns, line widths, densities or coil figures of the coil pattern 202 in the sensing units S1,1~Sx,y of the unit region U are designed to be not completely the same, so that the sensing trigger forces of the sensing units S1,1~Sx,y are not completely the same.

Generally, an operation principle of the inductive touch sensing apparatus is to measure an inductance variation amount between the first electrode layer 202 and the second electrode layer 212 to estimate a touch position (the XY plane). Inductance variation relates to a distance between the first electrode layer 202 and the second electrode layer 212 and an overlapping area of the first electrode layer 202 and the second electrode layer 212. Therefore, in the present embodiment, by designing the numbers of turns, the line widths, the densities or the coil figures of the coil pattern 202 in the sensing units S1,1~Sx,y of the unit region U to be not completely the same, the inductance variation (the sensing trigger forces) of the sensing units S1,1~Sx,y are not completely the same.

According to the above descriptions, when a user touches the unit region U of the touch sensing apparatus, a distance between the second electrode layer 212 and the opposite first electrode layer 202 is varied due to that the second electrode layer 212 is pressed down. Now, the unit region U generates a corresponding touch signal. Then, a touch position (a position on the XY plane) of the user can be estimated according to the touch signal. Moreover, since the sensing units S1,1~Sx,y of the unit region U has different sensing trigger forces, when the user touches the unit region U, specific sensing units in the sensing units S1,1~Sx,y of the touched unit region U are triggered. A touch force of the touch operation along the Z-direction can be estimated through analysis and calculation. In other words, besides including a touch position signal of the XY plane, the touch signal also includes a touch force signal of the Z-direction.

In the aforementioned inductive touch sensing apparatus, besides the numbers of turns, the line widths, the densities or the coil figures of the coil pattern 202 in the sensing units S1,1~Sx,y of the unit region U are designed to be not completely the same to achieve the effect that the sensing trigger forces of the sensing units S1,1~Sx,y are not completely the same, the above effect can also be implemented through thickness design of the electrode layers, and different designs of the space structures, which are described as follows.

Figure 10:
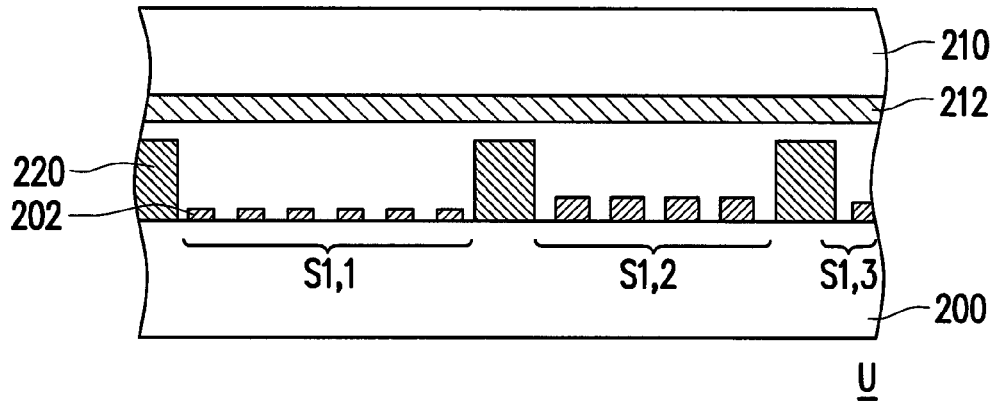
FIGS. 10-13 are top views of a unit region of a touch sensing apparatus according to multiple exemplary embodiments of the disclosure.

FIG. 10 is a top view of a unit region of a touch sensing apparatus according to an exemplary embodiment of the disclosure. The exemplary embodiment of FIG. 10 is similar to the embodiment of FIG. 8 and FIG. 9, so that the same devices are denoted by the same symbols, and descriptions thereof are not repeated. Referring to FIG. 10, in the present exemplary embodiment, thicknesses of the first electrode layers 202 (the coil patterns) in the sensing units S1,1~Sx,y of the unit region U are not completely the same. For example, the thickness of the first electrode layer 202 (the coil pattern) in the sensing unit S1,1 is relatively thin, and the thickness of the first electrode layer 202 (the coil pattern) in the sensing unit S1,2 is relatively thick. In this way, the sensing trigger force of the sensing unit S1,1 is greater than the sensing trigger force of the sensing unit S1,2. In other words, by designing the thicknesses of the first electrode layers 202 (the coil patterns) in the sensing unit S1,1~Sx,y to be not completely the same, the sensing trigger forces of the sensing units S1,1~Sx,y are not completely the same.

In the exemplary embodiment of FIG. 10, the thicknesses of the first electrode layers 202 (the coil patterns) in the sensing unit S1,1~Sx,y are designed to be not completely the same, though in other embodiments, thicknesses of the second electrode layers 212 in the sensing unit S1,1~Sx,y are designed to be not completely the same to achieve the effect that the sensing trigger forces of the sensing units S1,1~Sx,y are not completely the same. Alternatively, thicknesses of the first electrode layers 202 (the coil patterns) and the second electrode layers 212 in the sensing unit S1,1~Sx,y are designed to be not completely the same to achieve the effect that the sensing trigger forces of the sensing units S1,1~Sx,y are not completely the same.

Figure 11:
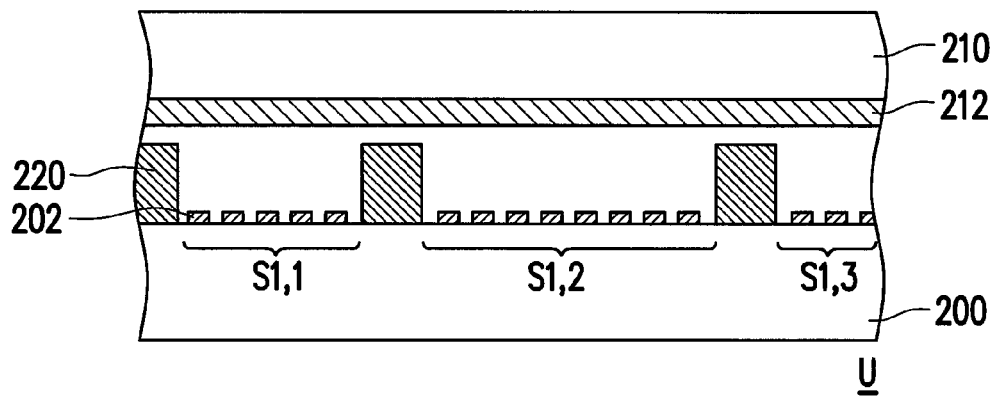

FIG. 11 is a cross-sectional view of a unit region of a touch sensing apparatus according to an exemplary embodiment of the disclosure. The exemplary embodiment of FIG. 11 is similar to the embodiment of FIG. 8 and FIG. 9, so that the same devices are denoted by the same symbols, and descriptions thereof are not repeated. Referring to FIG. 11, in the present exemplary embodiment, the spacer structure 220 of the unit region U includes a plurality of dot spacers, and spaces of the dot spacers 220 are not completely the same. For example, the space of the dot spacers 220 located at two sides of the sensing unit S1,1 is smaller than the space of the dot spacers 220 located at two sides of the sensing unit S1,2, so that the sensing trigger force of the sensing unit S1,1 is greater than the sensing trigger force of the sensing unit S1,2. Moreover, in other embodiments, by designing shapes of the dot spacers 220 in the unit region U to be not completely the same, the sensing trigger forces of the sensing units S1,1~Sx,y can be not completely the same.

Figure 12:
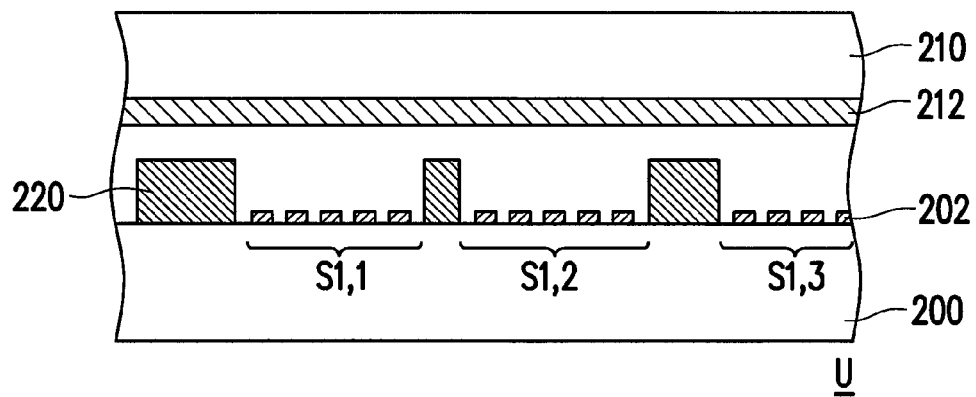

FIG. 12 is a cross-sectional view of a unit region of a touch sensing apparatus according to an exemplary embodiment of the disclosure. The exemplary embodiment of FIG. 12 is similar to the embodiment of FIG. 8 and FIG. 9, so that the same devices are denoted by the same symbols, and descriptions thereof are not repeated. Referring to FIG. 12, in the present exemplary embodiment, the spacer structure 220 of the unit region U includes a plurality of dot spacers, and sizes of the dot spacers 220 are not completely the same. For example, the size of the dot spacer 220 located at the left side of the sensing unit S1,1 is relatively large, and the size of the dot spacer 220 located between the sensing unit S1,1 and the sensing unit S1,2 is relatively small. By designing the sizes of the dot spacers 220 in the unit region U to be not completely the same, the sensing trigger forces of the sensing units S1,1~Sx,y can be not completely the same.

Figure 13:
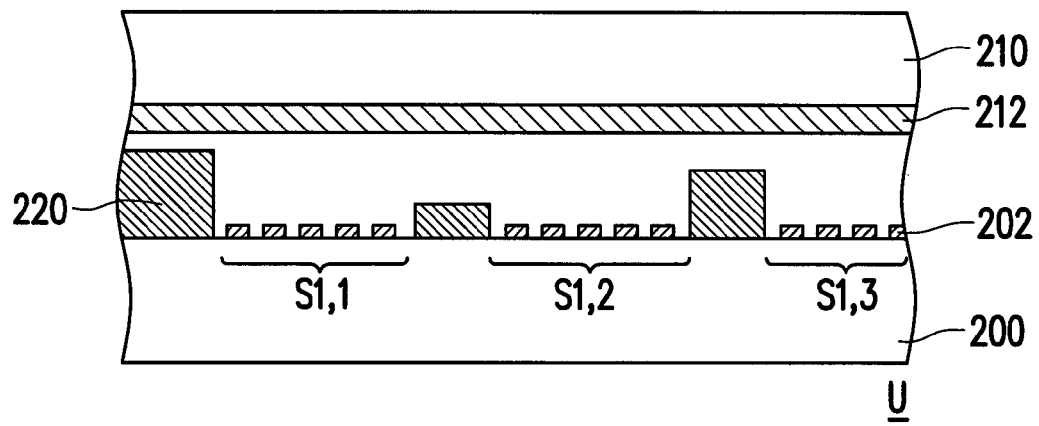

FIG. 13 is a cross-sectional view of a unit region of a touch sensing apparatus according to an exemplary embodiment of the disclosure. The exemplary embodiment of FIG. 13 is similar to the embodiment of FIG. 8 and FIG. 9, so that the same devices are denoted by the same symbols, and descriptions thereof are not repeated. Referring to FIG. 13, the spacer structure 220 in the unit region U includes a plurality of dot spacers, and heights of the dot spacers 220 are not completely the same. For example, the height of the spacer structure 220 located at the left side of the sensing unit S1,1 is relatively high, and the height of the spacer structure 220 located between the sensing unit S1,1 and the sensing unit S1,2 is relatively low. By designing the heights of the spacer structures 220 to be not completely the same, the sensing trigger forces of the sensing units S1,1~Sx,y are not completely the same.

EXAMPLES

Two operation examples of the touch sensing apparatus are used to describe a method for estimating a touch force of the touch sensing apparatus of the disclosure. In the following examples, the touch sensing apparatus of FIG. 3 is taken as an example for descriptions. Those skilled in the art can deduce methods for estimating the touch force of the touch sensing apparatuses of the other embodiments according to descriptions of the following examples.

Example 1

Figure 14:
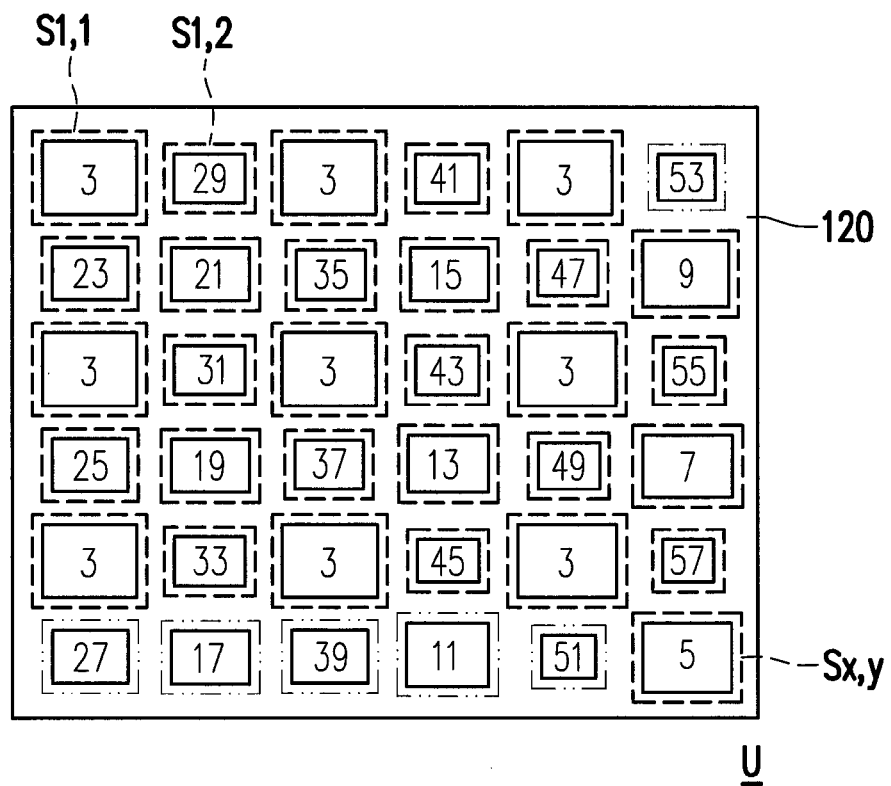
FIG. 14 is an operational schematic diagram of a unit region of a touch sensing apparatus according to an exemplary embodiment of the disclosure.

FIG. 14 is a schematic diagram of a unit region of a touch sensing apparatus. Referring to FIG. 14, in this example, 6×6 sensing units S1,1~Sx,y are designed in the unit region U, and the sensing trigger forces of the sensing units S1,1~Sx,y are not completely the same. In the example of FIG. 14, a number marked in each of the sensing units S1,1~Sx,y represents a corresponding sensing trigger force, which includes 3 gf, 5 gf, 7 gf, 9 gf, . . . , 57 gf.

Figure 15:
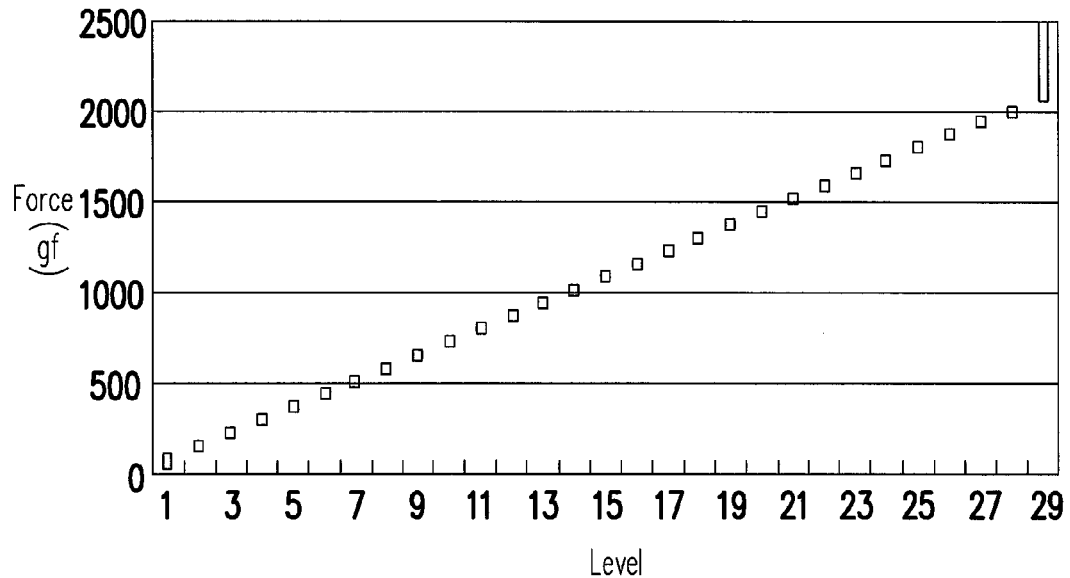
FIG. 15 is a diagram illustrating a relationship of touch levels and touch forces of a unit region in a touch sensing apparatus according to an exemplary embodiment of the disclosure.

According to the design of the sensing units S1,1~Sx,y in the unit region U of FIG. 14 and the sensing trigger forces thereof, recognizable touch force levels of the unit region U are 29 levels, as that shown in FIG. 15. A first level to a 29$^{th}$ level all have corresponding touch forces (0.1 gf~2.0 kgf and more than 2.0 kgf). It should be noticed that the more the number of the sensing units S1,1~Sx,y in the unit region U is, the more the recognizable touch force levels of the unit region U are. Moreover, the touch force range (0.10 gf~2.0 kgf and more than 2.0 kgf) designed in the unit region U can also be determined according to an actual application requirement. For example, if the touch sensing apparatus is applied to a beating game machine, the touch force range can be 0.1 gf~2.0 kgf and more than 2.0 kgf. However, if the touch sensing apparatus is applied to a portable electronic product, the touch force range thereof is unnecessary to reach 2.0 kgf.

According to the above descriptions, referring to FIG. 14, when the user touches the unit region U of the touch sensing apparatus, it is assumed that a touch force of 10 gf is exerted on each of the sensing units S1,1~Sx,y, and the sensing units S1,1~Sx,y having the sensing trigger forces smaller than 10 gf (smaller than or equal to 9 gf) are all triggered. In other words, in FIG. 14, the sensing units S1,1~Sx,y marked as 3 gf, 5 gf, 7 gf and 9 gf are all triggered.

Now, the sensing units S1,1~Sx,y having the sensing trigger forces greater than 10 gf that are located between the triggered sensing units S1,1~Sx,y are also regarded to be triggered. For example, the sensing trigger force of the sensing unit S1,2 located between the sensing unit S1,1 and the sensing unit S1,3 is 29 gf (which is greater than 10 gf), and since the sensing unit S1,1 and the sensing unit S1,3 are all triggered, the sensing unit S1,2 is also regarded to be triggered. This is mainly because that when the user's finger touches the unit region U, if the sensing unit S1,1 and the sensing unit S1,3 are all triggered, the sensing unit S1,2 there between must be pressed by a certain degree of the pressing force. Therefore, the sensing unit S1,2 is regarded to be triggered at the same time. Moreover, in the unit region U, the triggered sensing units are marked by thick dash lines, and the un-triggered sensing units are marked by fine dash lines.

Then, each of the triggered sensing units S1,1~Sx,y in the unit region U is regarded to endure a force of 9 gf, and then the number (30) of the triggered sensing units S1,1~Sx,y is multiplied by 9 gf to obtain a total force (270 gf) of the unit region U. In other words, the touch force exerted on the unit region U is at least 270 gf. According to FIG. 15, it is known that the touch operation belongs to the touch force of a fourth level.

Example 2

Figure 16:
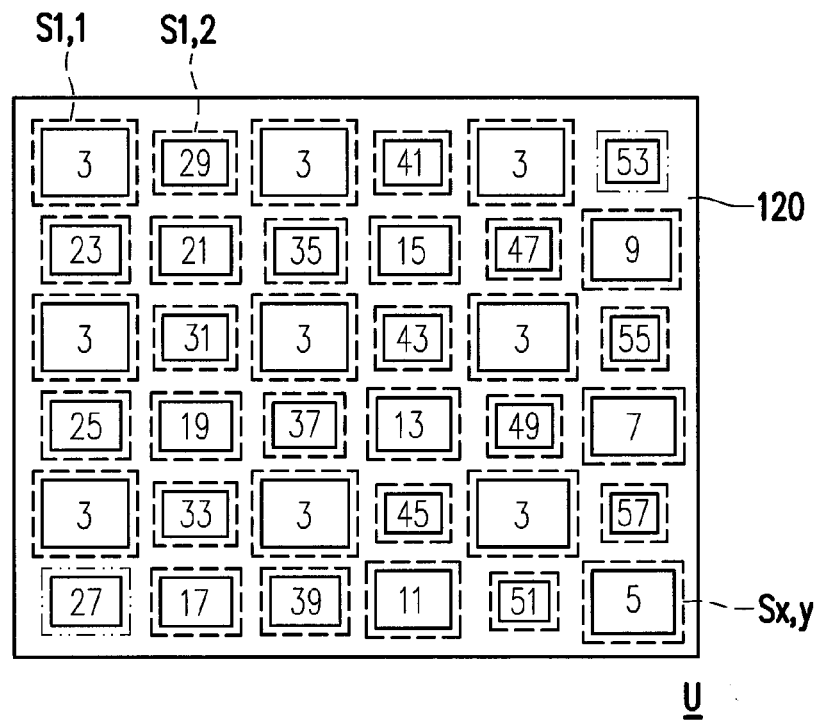
FIG. 16 is an operational schematic diagram of a unit region of a touch sensing apparatus according to another exemplary embodiment of the disclosure.

FIG. 16 is a schematic diagram of a unit region of the touch sensing apparatus of FIG. 3. Referring to FIG. 16, in this example, 6×6 sensing units S1,1~Sx,y are designed in the unit region U, and the sensing units S1,1~Sx,y have a plurality of sensing trigger forces. In the example of FIG. 16, the number marked in each of the sensing units S1,1~Sx,y represents a corresponding sensing trigger force, which includes 3 gf, 5 gf, 7 gf, 9 gf, . . . , 57 gf.

Similarly, according to the design of the sensing units S1,1~Sx,y in the unit region U of FIG. 16 and the sensing trigger forces thereof, recognizable touch force levels of the unit region U are 29 levels, as that shown in FIG. 15.

According to the above descriptions, when the user touches the unit region U of the touch sensing apparatus, it is assumed that a touch force of 20 gf is exerted on each of the sensing units S1,1~Sx,y, and the sensing units S1,1~Sx,y having the sensing trigger forces smaller than 20 gf (smaller than or equal to 19 gf) are all triggered. In other words, in FIG. 16, the sensing units S1,1~Sx,y marked as 3 gf, 5 gf, 7 gf, 9 gf, 11 gf, 13 gf, 17 gf and 19 gf are all triggered.

Now, the sensing units S1,1~Sx,y having the sensing trigger forces greater than 20 gf that are located between the triggered sensing units S1,1~Sx,y are also regarded to be triggered. For example, the sensing trigger force of the sensing unit S1,2 located between the sensing unit S1,1 and the sensing unit S1,3 is 29 gf (which is greater than 20 gf), and since the sensing unit S1,1 and the sensing unit S1,3 are all triggered, the sensing unit S1,2 is also regarded to be triggered. This is mainly because that when the user's finger touches the unit region U, if the sensing unit S1,1 and the sensing unit S1,3 are all triggered, the sensing unit S1,2 there between must be pressed by a certain degree of the pressing force. Therefore, the sensing unit S1,2 is regarded to be triggered at the same time. Moreover, in the unit region U, the triggered sensing units are marked by thick dash lines, and the un-triggered sensing units are marked by fine dash lines.

Then, each of the triggered sensing units S1,1~Sx,y in the unit region U is regarded to endure a force of 19 gf, and then the number (34) of the triggered sensing units S1,1~Sx,y is multiplied by 19 gf to obtain a total force (646 gf) of the unit region U. In other words, the touch force exerted on the unit region U is at least 646 gf. According to FIG. 15, it is known that the touch operation belongs to the touch force of an eighth level.

In summary, since each of the unit regions of the touch sensing apparatus has a plurality of the sensing units, and the sensing trigger forces of the sensing units are not completely the same, when the user touches the touch sensing apparatus, a magnitude of the touch force exerted on the unit region can be estimated according to triggering status of the sensing units of the unit region. Since the touch sensing apparatus of the disclosure can calculate the touch force exerted on the unit region, it can be widely applied in wider and various touch applications.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A touch sensing apparatus, having a plurality of unit regions, and each of the unit regions of the touch sensing apparatus comprising:
   a first substrate, having a first electrode layer thereon, wherein the first electrode layer completely covers the first substrate;
   a second substrate, disposed opposite to the first substrate, and having a second electrode layer thereon, wherein the second electrode layer completely covers the second substrate; and
   a spacer structure, disposed between the first substrate and the second substrate, wherein the unit region has a plurality of sensing units, and sensing trigger forces of the sensing units are not completely the same.

2. The touch sensing apparatus as claimed in claim 1, wherein the spacer structure defines the sensing units in the unit region.

3. The touch sensing apparatus as claimed in claim 2, wherein the spacer structure is disposed on the first electrode layer, and areas of the first electrode layer exposed by the spacer structure in the sensing units are different.

4. The touch sensing apparatus as claimed in claim 2, wherein the spacer structure in the unit region is a mesh spacer structure.

5. The touch sensing apparatus as claimed in claim 2, wherein the spacer structure in the unit region comprises a plurality of dot spacers.

6. The touch sensing apparatus as claimed in claim 5, wherein shapes, sizes or spaces of the dot spacers are not completely the same.

7. The touch sensing apparatus as claimed in claim 1, wherein the spacer structure in the unit region comprises a plurality of dot spacers, and heights of the dot spacers are not completely the same.

8. A touch sensing apparatus, having a plurality of unit regions, and each of the unit regions of the touch sensing apparatus comprising:
 a first substrate, having a first electrode layer thereon, wherein the first electrode layer completely covers the first substrate;
 a second substrate, disposed opposite to the first substrate, and having a second electrode layer thereon, wherein the second electrode layer completely covers the second substrate, and thicknesses of at least one of the first electrode layer and the second electrode layer in the unit region are not completely the same; and
 a spacer structure, disposed between the first substrate and the second substrate, wherein the unit region has a plurality of sensing units, and sensing trigger forces of the sensing units are not completely the same.

9. The touch sensing apparatus as claimed in claim 1, wherein the first electrode layer in the unit region has a coil pattern.

10. The touch sensing apparatus as claimed in claim 9, wherein numbers of turns, line widths, densities or coil figures of the coil pattern in the sensing units are not completely the same.

11. The touch sensing apparatus as claimed in claim 9, wherein thicknesses of at least one of the first electrode layer and the second electrode layer in the sensing units of the unit region are not completely the same.

12. The touch sensing apparatus as claimed in claim 9, wherein the spacer structure in the unit region comprises a plurality of dot spacers, and heights, shapes, sizes or spaces of the dot spacers are not completely the same.

13. The touch sensing apparatus as claimed in claim 1, wherein materials of the first electrode layer and the second electrode layer are transparent conductive materials or non-transparent conductive materials.

14. The touch sensing apparatus as claimed in claim 1, wherein one of the first substrate and the second substrate is a flexible substrate, and another one is a rigid substrate.

* * * * *